(12) United States Patent
Koschinat

(10) Patent No.: US 8,276,981 B2
(45) Date of Patent: Oct. 2, 2012

(54) FRAME ARRANGEMENT FOR A VEHICLE

(75) Inventor: Hubert Koschinat, Hösbach (DE)

(73) Assignee: SAF-Holland GmbH, Bessenbach (DE)

( * ) Notice: Subject to any disclaimer, the term of this patent is extended or adjusted under 35 U.S.C. 154(b) by 403 days.

(21) Appl. No.: 12/518,791

(22) PCT Filed: Dec. 18, 2007

(86) PCT No.: PCT/EP2007/011139
§ 371 (c)(1),
(2), (4) Date: Dec. 7, 2009

(87) PCT Pub. No.: WO2008/074480
PCT Pub. Date: Jun. 26, 2008

(65) Prior Publication Data
US 2010/0117404 A1    May 13, 2010

(30) Foreign Application Priority Data

Dec. 20, 2006  (DE) .......................... 10 2006 060 405

(51) Int. Cl.
*B60J 7/00* (2006.01)
(52) U.S. Cl. ................................... 296/204; 280/124.11
(58) Field of Classification Search .................. 296/204, 296/203.1, 203.01; 280/124.11, 124.116
See application file for complete search history.

(56) References Cited

U.S. PATENT DOCUMENTS

| | | | | |
|---|---|---|---|---|
| 5,118,131 A | * | 6/1992 | Manning | 280/124.109 |
| 5,366,237 A | * | 11/1994 | Dilling et al. | 280/124.116 |
| 5,988,734 A | * | 11/1999 | Longo et al. | 296/203.01 |
| 6,073,947 A | * | 6/2000 | Gottschalk et al. | 280/124.128 |
| 7,789,405 B2 | * | 9/2010 | Lie | 280/124.116 |

FOREIGN PATENT DOCUMENTS

| | | |
|---|---|---|
| DE | 19809209 A1 | 9/1999 |
| DE | 102004054939 A1 | 5/2006 |
| EP | 1380448 A1 | 1/2004 |
| EP | 1481824 A1 | 12/2004 |
| FR | 2314069 A1 | 1/1977 |

OTHER PUBLICATIONS

European Patent Office, "International Search Report" for PCT Application No. PCT/EP2007/011139, Apr. 21, 2008, 2 Pages.

* cited by examiner

*Primary Examiner* — Joseph Pape
(74) *Attorney, Agent, or Firm* — Price Heneveld LLP

(57) ABSTRACT

A frame arrangement for a vehicle comprises a first frame element extending a substantially lengthwise direction of a vehicle, a fastening element having sidewalls and operably coupled to the first frame element and configured to hold an axle guide, a second frame element extending substantially at right angles to the first frame element fastened to the fastening element such that the second frame element surrounds at least some region of the fastening element, and wherein the second frame element is substantially U-shaped and includes at least a pair of fastening segments forming legs of the U-shaped fastening segment.

11 Claims, 2 Drawing Sheets

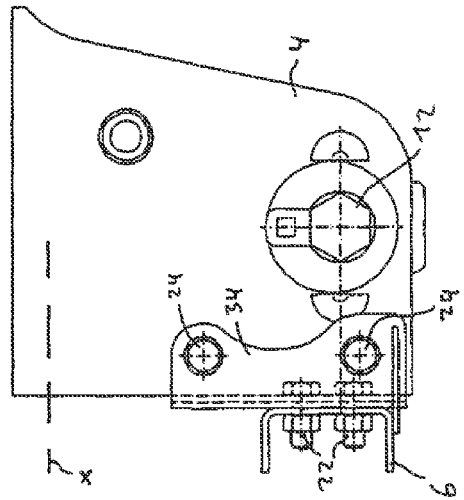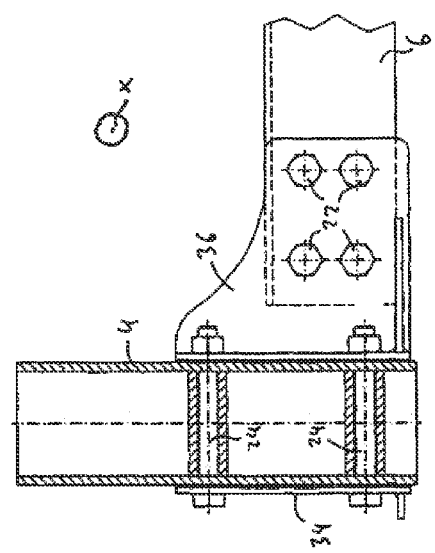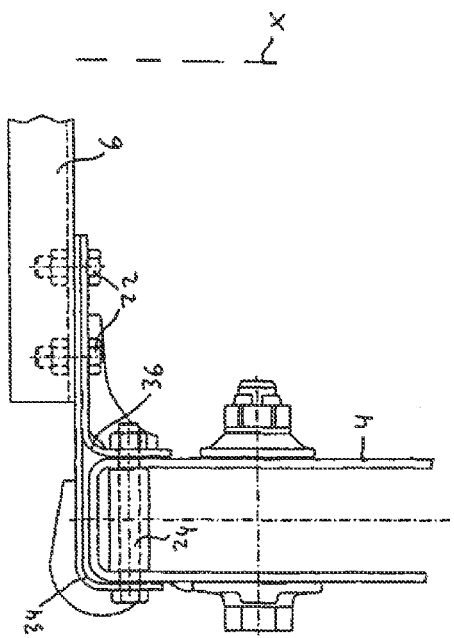

FRAME ARRANGEMENT FOR A VEHICLE

BACKGROUND OF INVENTION

1. Field of the Invention

The present invention relates to a frame arrangement for a vehicle, especially a commercial vehicle, and in particular to a frame arrangement which generally consists of two U or double-T shaped profiles, which being longitudinal beams are joined to each other at a design-determined spacing via cross beams into a so-called "ladder frame", on which vehicle elements such as cargo surfaces, superstructures, brake mechanisms, running gears and so forth are arranged.

2. Technical Background

Heretofore, such ladder frame arrangements are generally configured such that the individual profiles are welded, riveted, or bolted together, so as to form a rigid vehicle frame. The problem with such frame arrangements, however, is that the torsion capability of this connection can be so greatly restricted that cracks may occur in the frame arrangement during operation of the vehicle, especially at welded seams and/or at transitions with especially pronounced differences in rigidity.

Thus, the problem of the present invention is to provide a frame arrangement for a vehicle, especially a commercial vehicle, which can safely absorb the forces acting on it and at the same time assure the required elasticity.

SUMMARY OF THE INVENTION

According to the invention, a frame arrangement is provided for a vehicle, especially a commercial vehicle, comprising a first frame element that extends essentially in the lengthwise direction of the vehicle, a fastening element that is arranged on the first frame element and configured to hold an axle guide, and a second frame element that is arranged essentially at right angles to the first frame element, the second frame element being fastened to the fastening element such that the second frame element surrounds the fastening element at least in some regions. The first frame element extends essentially in the lengthwise direction of the vehicle, i.e., essentially parallel to a lengthwise axis of the vehicle. Two frame elements are provided, each frame element being provided on one side of the vehicle (the right side and left side). The first frame element can be configured from two U-shaped profiles such that the base of the U-shaped profiles is turned toward each other, and the distal end regions point away from each other. The first frame element can also be configured from a double T-shaped profile. Of course, the first frame element can also be composed of any other desired cross sectional configuration. On the first frame element is provided a fastening element that is configured to support or attach an axle guide or trailing link. The fastening element thus advantageously has a bearing region, on which the axle guide is attached, preferably being able to twist or rotate. The second frame element is preferably arranged essentially at right angles or perpendicular to the first frame element. In other words, the second frame element is arranged such that it lies essentially transverse to the lengthwise direction of the vehicle. This arrangement includes in particular a frame arrangement in which the second frame element extends between two spaced-apart first frame elements. Consequently, a fastening region of the second frame element on the first frame element need not necessarily be arranged essentially at right angles to the latter, but instead can also make any desired angle with the first frame element.

The frame arrangement is particularly well adapted for use with vehicles which have an axle system with a pneumatic cushioning system. In these axle systems, basically all vertical forces arising are transmitted both by the fastening element and by the air spring bellows to the frame arrangement, especially the first frame element. The remaining forces, however, such as lateral forces, braking forces or stabilization torques, can only be transmitted by the fastening element to the frame arrangement, since the air spring bellows can generally transmit only vertically directed forces. For this reason, the connection system between a first frame element, fastening element, and axle guide is under very high strain and its design demands high strength. On the other hand, however, these components need to be configured as elastic as possible, so that the frame arrangement can twist in a given degree. Therefore, according to the invention, the second frame element is secured to the fastening element such that the second frame element surrounds the fastening element at least in some regions. This makes it possible to configure the regions on the fastening element that are especially endangered by the cross beam attachments and fastenings by means of advantageously expandable bolt connections or rivets so that all types of forces which occur can be distributed over broad areas and, at the same time, the frame arrangement remains elastic.

In a particular embodiment, the second frame element has a fastening segment of essentially U-shaped configuration, and the side segments forming the legs of the U are arranged on the fastening element. The fastening segment of the second frame element is advantageously U-shaped in cross section, and the side segments of the fastening segment are arranged essentially parallel to one dimension of the first frame element or parallel to the lengthwise direction of the vehicle. Thus, the second frame element surrounds the fastening element in the lengthwise direction of the vehicle, especially in the front. The side segments forming the legs of the U are arranged on or attached to welded wall regions of the fastening element.

In another particular embodiment, the second frame element is configured as one part or one piece, at least in the region of the fastening segment. This provides an especially stable second frame element in the region of the fastening segment, so that especially large forces can be absorbed by the second frame element.

In another preferred embodiment, the second frame element is configured with multiple parts or multiple pieces, preferably two pieces, at least in the region of the fastening segment. This makes it possible to configure the second frame element especially variably and flexibly, so that the fastening segment of the second frame element can be "adjusted" to different sizes of fastening element. Thanks to the multipart configuration of the second frame element in the region of the fastening segment, furthermore, an advantageous production simplification is made possible.

Preferably, the second frame element has a first end segment extending essentially perpendicular to the lengthwise dimension of the second frame element, being preferably arranged on the outside of the fastening element. The first end segment here corresponds in particular to the aforementioned second segment of the second frame element, so that it extends most advantageously parallel to the lengthwise direction of the vehicle. Preferably, the first end segment is arranged on or attached to the outside of the fastening element. The outside here is that side of the fastening element facing outward on the vehicle, or the vehicle's outside.

Moreover, the second frame element has a preferably essentially L-shaped second end segment, which is arranged on the inside of the fastening element. The inside of the fastening element here is in particular the side of the fastening element turned toward the inside of the vehicle. In a frame arrangement with two first frame elements, which are spaced apart and extend parallel to each other along the side regions of the vehicle, the insides of the fastening element are thus facing each other, whereas the outsides of the fastening element are turned away from each other. The essentially L-shaped configuration of the second end segment is especially advantageous in a configuration separate from the first end segment, i.e., for the aforementioned multipart or multipiece configuration of the second frame element at least in the region of the fastening segment. Of course, the second end segment can also have any other configuration different from the L-shape, as long as one region of the fastening element is surrounded by the combination of first and second end segment.

Preferably, the second end segment is secured by fasteners such as rivets or bolts to the fastening segment of the second frame element. In this way, the connection between second frame element and the second end segment remains elastic and can thus afford all necessary pliancy in the long term.

Also preferably, the second frame element is secured by fasteners such as bolts or rivets to the fastening element. The fasteners here are arranged basically transversely to the driving direction and configured so that the connection between the second frame element and the fastening element remains elastic and thus can afford all necessary pliancy in the long term. This is accomplished in particular by the natural elasticity of the fasteners. Moreover, this effect is intensified in that the fastening element and the second frame element are not rigidly secured to each other as with welding, but instead slight displacements with respect to each other are made possible due to the separate or multipart configuration.

Preferably, the second frame element is configured as a cross beam extending essentially transversely to the driving direction. Advantageously, the cross beam extends in a horizontal plane transversely to the driving direction, so that it is arranged between two opposite lying fastening elements of an axle. The cross beam in this case can be configured as a single part or single piece or as a multiple part or multiple piece. Due to the multipart or multi-piece configuration, it is especially advantageously ensured that different center to center spacings of the vehicle's longitudinal beams can be connected by the same cross beam system.

In another preferred embodiment, the frame arrangement furthermore has a reinforcement unit, which is formed from at least one reinforcement profile and arranged between the first and second frame element. The reinforcement unit can be made from an essentially one-piece profile, however, the reinforcement unit is preferably made as a multiple part, for example, such that the individual parts can be shifted and secured telescopically relative to each other. The reinforcement profile can have any given cross sectional configuration, however, the reinforcement profile is preferably U-shaped in cross section. The reinforcement unit extends essentially in a vertical plane and is arranged on or fastened to the second frame element spaced from the fastening segment. The fastening can advantageously occur by a bolt connection. The attachment or fastening of the reinforcement unit to the first frame element can be done directly on the latter. Advantageously, the first frame element has a reinforcement element, such as a web plate, at its region away from the fastening element, on which the reinforcement unit is fastened, preferably by a bolt connection. Due to the fastening by means of bolts or rivets, as mentioned above, one achieves an advantageously torsionable or elastic connection, which can resist the formation of cracks, as occur with welding.

The reinforcement unit is thus secured by a bolt and/or rivet connection to the first and second frame element.

Further advantages and features will emerge from the following description of preferred and sample embodiments of the invented frame arrangement with reference to the enclosed figures, written specification and claims, wherein individual elements or features of the embodiments can be combined to yield a new embodiment.

BRIEF DESCRIPTION OF THE DRAWINGS

FIGS. 2a-2c, include a front view, a top view, and a side view of a second sample embodiment of the invented frame arrangement.

DETAILED DESCRIPTION OF THE PREFERRED EMBODIMENTS

Figure 1C:
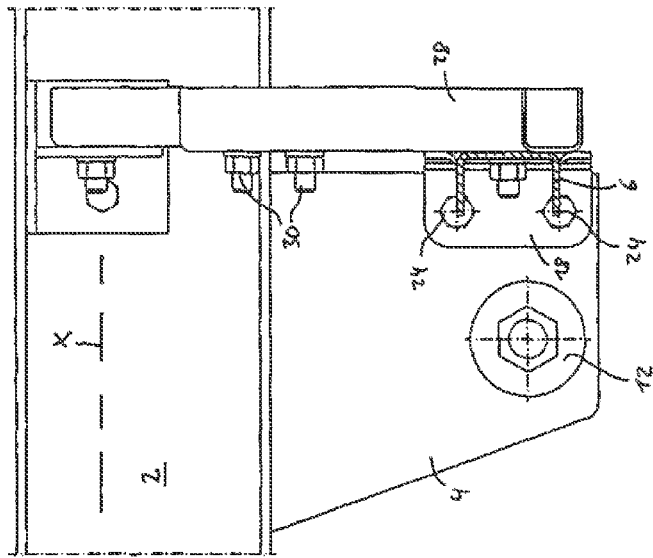
FIGS. 1a-1c, include a front view, a top view, and a side view of a first sample embodiment of the invented frame arrangement.
Figure 1A:
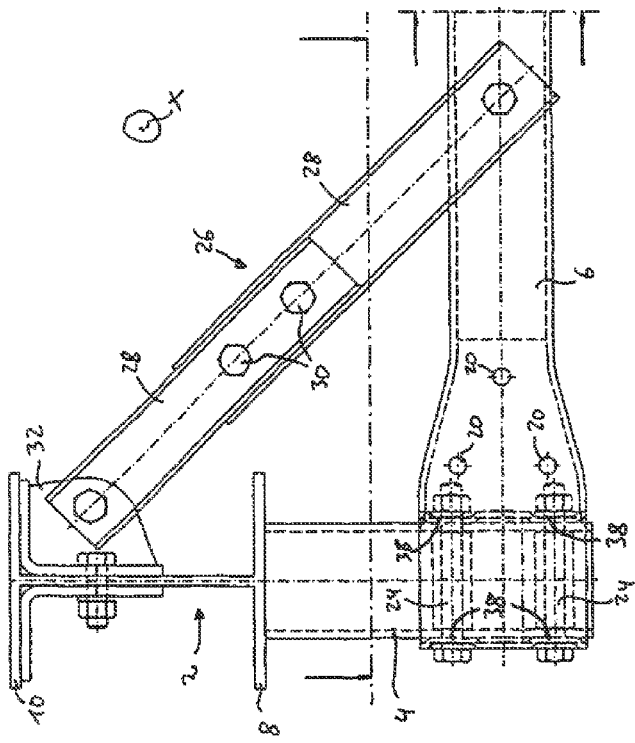
Figure 1B:
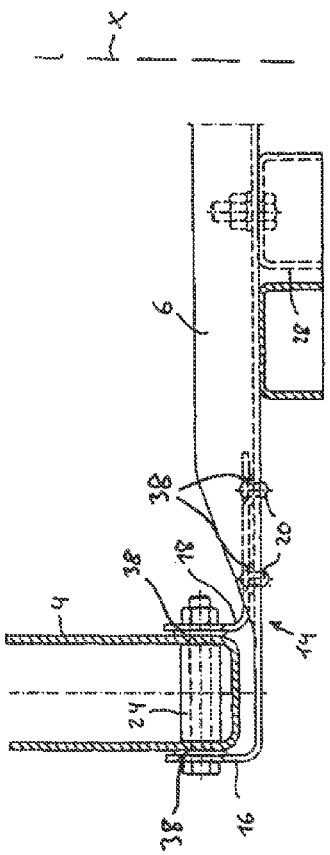

FIGS. 1a-1c shows a front view, a top view, and a side view of a sample embodiment of the invented frame arrangement for a vehicle, in particular, a commercial vehicle. The frame arrangement comprises a first frame element 2, a fastening element 4, and a second frame element 6.

The first frame element 2 extends basically in the lengthwise direction of the vehicle or basically parallel to the vehicle's lengthwise axis X. Two first frame elements 2 are provided, which are spaced apart in relation to the vehicle's lengthwise axis X. The first frame element 2 is configured as a U or double T-shaped profile, so that this profile defines a bottom flange 8 and a top flange 10. On the first frame element 2, additional vehicle elements such as cargo surface, superstructures, brake mechanisms, and running gear components are arranged. Thus, the cargo surface and the superstructures are arranged accordingly on the top flange 10, while the other running gear components are fastened to the bottom flange 8. This is done by the fastening element 4, which is secured to the first frame element 2, especially to its bottom flange 8. The fastening can be done by a welding or also, especially advantageously, by a bolting or rivet connection.

The fastening element 4, in particular, serves to mount an axle guide or trailing link, which is arranged so that it can turn or pivot relative to the fastening element 4. For this, the fastening element 4 has a bearing arrangement 12.

The second frame element 6 is advantageously basically arranged at right angles, i.e., transverse to the vehicle's lengthwise axis X, relative to the first frame element 2. Consequently, the second frame element 6 is configured in particular as a cross beam extending transversely to the driving direction, constituting a connection between the two spaced-apart first frame elements 2. The second frame element 6 can be designed as a one-part element. Advantageously, however, it is designed as a multipart element, so as to allow for different distances of the first frame elements 2 from the center of the vehicle.

The second frame element 6 is secured on the fastening element 4 such that the second frame element 6 encloses the fastening element 4 at least in some regions. For this, the second frame element 6 has a fastening segment 14, which is configured as basically a U-shape in cross section. The side segments forming the legs of the U are consequently arranged on side walls of the fastening element 4. The side segments are formed by a first end segment 16 and a second end segment 18. The first end segment 16 extends essentially perpendicular to the lengthwise dimension of the second frame element 6, i.e., essentially parallel to the vehicle's lengthwise axis X and is preferably arranged on the outside of the fastening element 4. Accordingly, the second end segment 18 is arranged on the inside of the fastening element 4. In the embodiment shown, the second end segment 18 is basically configured in an L-shape. Of course, the second end segment 18 can have any other geometrical shape desired, as long as the second end segment 18 contributes to enclosing the fastening element 4 at least in some regions. Moreover, the first end segment 16 can likewise be arranged on the inside of the fastening element, so that the second end segment 18 consequently encloses the outside of the fastening element 4. Preferably, the second end segment 18 is secured to the fastening segment 14 of the second frame element 6 by fasteners, which can be formed as a rivet connection 20 or bolt connection 22 (see FIGS. 2a-2c). The fastening of the second frame element 6 to the fastening element 4 is done by fasteners 24, which can especially advantageously be configured as a bolt connection. The fasteners 24 advantageously extend essentially transverse to the vehicle's lengthwise axis X and form an elastic connection between the second frame element 6 and the fastening element 4. The "elastic connection" here should be construed in particular in the sense that the connection formed by fastening element 4 and second frame element 6 enables a certain measure of torsion, as opposed to a welded connection familiar to the prior art.

The frame arrangement has a reinforcement unit 26, which extends between the second frame element 6 and the first frame element 2. The reinforcement unit 26 can have a one part or one piece configuration. Preferably, however, this is formed from a plurality of reinforcement profiles 28, which can preferably move telescopically in one another and be secured in a particular position by means of a bolt connection 30 at a particular length. The reinforcement profiles 28 are advantageously configured as a U-profile in cross section. The reinforcement unit 26 is secured to the second frame element 6, near the fastening segment 14, by a bolt or rivet connection. At the opposite end, the reinforcement unit 26 is secured indirectly on the first frame element 2. The securing in this place is done preferably indirectly by reinforcement element 32 provided on the top flange 10 and is likewise configured as a bolt or rivet connection. As a result of the bolt or rivet connection, as explained above, one achieves an advantageously elastic connection, so that some torsion ability of the frame arrangement is assured.

The frame arrangement has a reinforcement unit 26, which extends between the second frame element 6 and the first frame element 2. The reinforcement unit 26 can have a one part or one piece configuration. Preferably, however, this is formed from a plurality of reinforcement profiles 28, which can preferably move telescopically in one another and be secured in a particular position by means of a bolt connection 30 at a particular length. The reinforcement profiles 28 are advantageously configured as a U-profile in cross section. The reinforcement unit 26 is secured to the second frame element 6, near the fastening segment 14, by a bolt or rivet connection. At the opposite end, the reinforcement unit 26 is secured indirectly on the first frame element 2. The securing in this place is done preferably indirectly by a reinforcement element 32 provided on the top flange 10 and is likewise configured as a bolt or rivet connection. As a result of the bolt or rivet connection, as explained above, one achieves an advantageously elastic connection, so that some torsion ability of the frame arrangement is assured.

FIGS. 2a-2c shows a second sample embodiment of the frame arrangement, wherein the elements identical to the first embodiment have been given the same reference symbols. In contrast with the first embodiment, the second frame element 6 is configured as a longitudinal profile. The fastening segment on the fastening element 4 is formed here by an essentially L-shaped first end segment 34 and an essentially L-shaped second end segment 36, which are secured to the second frame element 6 by fasteners in the form of a bolt connection 22.

Corresponding to the above embodiment, the first end segment 34 and the second end segment 36 are joined by fasteners 24 in the form of a bolt connection to the fastening element 4 so that a certain degree of torsion is provided between these two components.

Thus, frame arrangements are provided according to the invention that have a sufficient strength to absorb vertical as well as horizontal forces, and at the same time a necessary elasticity to provide for the desired torsion ability.

Preferably, the second frame element 6 and/or the fastening element 4 has, in the region where they are fastened or fixed to each other, projections or elevations 38 directed toward the other of the two elements, for making contact with the bearing surface of the other of the elements. Thus, in the present sample embodiment depicted, the elevations 38 on the first end segment 16 and the second end segment 18 of the second frame element 6 are configured so that they are oriented toward the fastening element 4. Consequently, the contact surfaces between the second frame element 6 and the fastening element 4 are fashioned so that the contact between these elements is granted only immediately around the region where the fasteners 24 are situated. The other areas remain free of mutual contact and can be kept corrosion-free in the long term with the appropriate coating. Furthermore, the providing of elevations 38 accomplishes a stiffening effect for the elements, which can enhance the fatigue strength. Of course, the elevations 38 can be provided in addition or alternatively at appropriate positions of the fastening element 4 as well. Moreover, if the second frame element 6 has a multipart configuration, the connection sites between first end segment 16 and second end segment 18 can likewise have elevations 38. The elevations 38 in this case can be configured in the region of the rivet connection 20 either in the first end segment 16, or in the second end segment 18, or in both end segments, such that only a point contact is provided between first end segment 16 and second end segment 18.

In the foregoing description, it will be readily appreciated by those skilled in the art that modifications may be made to the invention without departing from the concepts disclosed herein. Such modifications are to be considered as included in the following claims, unless the claims by their language expressly state otherwise.

The invention claimed is:

1. A frame arrangement for a vehicle, comprising:
a first frame element extending in a substantially lengthwise direction of a vehicle;
a fastening element having sidewalls and operably coupled to the first frame element and configured to hold an axle guide; and
a second frame element extending substantially at right angles to the first frame element wherein the second frame element is fastened to the fastening element such that the second frame element surrounds at least some region of the fastening element, the second frame element has a substantially U-shape and includes at least a pair of fastening segments forming legs of a U-shaped fastening segment that are arranged on the side-walls of the fastening element, and wherein the at least pair of the fastening segments of the second frame element include a first end segment that is located outwardly of the fastening element.

2. The frame arrangement according to claim 1, wherein the second frame element includes a central portion located inwardly of the pair of fastening segments, and wherein the central portion of the second frame element is configured as a single, integral piece with at least one of the pair of fastening segments.

3. The frame arrangement according to claim 1, wherein the at least pair of fastening segments of the second frame element has an essentially L-shaped second end segment located inwardly of the fastening element.

4. The frame arrangement according to claim 3, wherein the second end segment is secured to a portion of the fastening segment by mechanical fasteners.

5. The frame arrangement according to claim 4, wherein the mechanical fasteners include bolts.

6. The frame arrangement according to claim 1, wherein the second frame element is secured to a portion of the fastening segment by mechanical fasteners.

7. The frame arrangement according to claim 6, wherein the mechanical fasteners include bolts.

8. The frame arrangement according to claim 1, wherein the second frame element comprises a cross beam extending substantially transversely to a driving direction of a vehicle.

9. The frame arrangement according to claim 1, further including:
a reinforcement unit including at least one reinforcement profile and operably coupled to the first and second frame element.

10. The frame arrangement according to claim 9, wherein the reinforcement unit is secured to the first and second frame element by mechanical fasteners.

11. The frame arrangement according to claim 10, wherein the reinforcement unit is secured to the first and second frame element by a plurality of bolts.

* * * * *